United States Patent
Bruguera

(10) Patent No.: US 10,353,671 B2
(45) Date of Patent: Jul. 16, 2019

(54) CIRCUITRY AND METHOD FOR PERFORMING DIVISION

(71) Applicant: ARM LIMITED, Cambridge (GB)

(72) Inventor: Javier Diaz Bruguera, Cambridge (GB)

(73) Assignee: ARM Limited, Cambridge (GB)

(*) Notice: Subject to any disclaimer, the term of this patent is extended or adjusted under 35 U.S.C. 154(b) by 256 days.

(21) Appl. No.: 14/994,601

(22) Filed: Jan. 13, 2016

(65) Prior Publication Data

US 2017/0199723 A1 Jul. 13, 2017

(51) Int. Cl.
*G06F 7/537* (2006.01)
*G06F 7/487* (2006.01)

(52) U.S. Cl.
CPC ............ *G06F 7/487* (2013.01); *G06F 7/4873* (2013.01); *G06F 7/537* (2013.01); *G06F 2207/5351* (2013.01)

(58) Field of Classification Search
CPC ................. G06F 7/4917; G06F 7/4873; G06F 7/535–5375; G06F 2207/5351–5353; G06F 2207/5355
(Continued)

(56) References Cited

U.S. PATENT DOCUMENTS 5,272,660 A * 12/1993 Rossbach .............. G06F 7/5375
708/504
5,309,383 A * 5/1994 Kuroiwa ............... G06F 7/5375
708/496
(Continued)

OTHER PUBLICATIONS

D. Kapur, M. Subramaniam, "Mechanizing Verification of Arithmetic Circuits: SRT Division", Proc. 17th FSTTCS LNCS, vol. 1346, pp. 103-122, 1997.*

(Continued)

*Primary Examiner* — Matthew D Sandifer
(74) *Attorney, Agent, or Firm* — Nixon & Vanderhye P.C.

(57) ABSTRACT

A data processing apparatus comprises signal receiving circuitry to receive a signal corresponding to a divide instruction that identifies a dividend x and a divisor d. Processing circuitry performs, in response to said divide instruction, a radix-N division algorithm to generate a result value $q=x/d$, where N is an integer power of 2 and greater than 1. Said division algorithm comprises a plurality of iterations, each of said plurality of iterations being performed by quotient digit calculation circuitry to determine a quotient value of that iteration $q[i+1]$ based on a remainder value of a previous iteration $rem[i]$; and remainder calculation circuitry to determine a remainder value of that iteration $rem[i+1]$ based on said quotient value of that iteration $q[i+1]$ and said remainder value of said previous iteration $rem[i]$. Result calculation circuitry derives said result value q based on each quotient value selected by said digit selection circuitry for each of said plurality of iterations. For at least some of said plurality of iterations, said quotient digit calculation circuitry speculatively determines a set of candidate values before a quotient value of said previous iteration is known and, in response to said quotient value of said previous iteration becoming known, determines said quotient value of that iteration $q[i+1]$ based on one of said candidate values.

19 Claims, 7 Drawing Sheets

(58) Field of Classification Search
USPC .................... 708/650, 504, 50, 653, 655
See application file for complete search history.

(56) References Cited

U.S. PATENT DOCUMENTS

| | | | | |
|---|---|---|---|---|
| 5,870,323 | A * | 2/1999 | Prabhu | G06F 7/535 |
| | | | | 708/542 |
| 9,086,890 | B2 * | 7/2015 | Olson | G06F 9/3885 |
| 2004/0083255 | A1 * | 4/2004 | Hinds | G06F 7/5375 |
| | | | | 708/650 |
| 2006/0129625 | A1 * | 6/2006 | Olson | G06F 7/4873 |
| | | | | 708/650 |
| 2010/0281087 | A1 * | 11/2010 | Powell | G06F 7/5375 |
| | | | | 708/209 |
| 2013/0124594 | A1 * | 5/2013 | Krishnamoorthy | G06F 7/535 |
| | | | | 708/653 |

OTHER PUBLICATIONS

G.S. Taylor, "Radix 16 SRT Dividers with Overlapped Quotient Selection Stages", Proc. Seventh IEEE Symp. Computer Arithmetic, pp. 64-71, 1985.*

D.L. Harris, S.F. Oberman, M.A. Horowitz, "SRT Division Architectures and Implementations", Proc. 13th IEEE Symp. Computer Arithmetic, 1997.*

Erik Alfredsson, "Design and implementation of a hardware unit for complex division", Department of Electrical Engineering, M.S. thesis, Linköping University, Sweden, 2005.*

D.L. Harris, S.F. Oberman, M.A. Horowitz, "SRT Division Architectures and Implementations", Proc. 13th IEEE Symp. Computer Arithmetic, 1997 (Year: 1997).*

G.S. Taylor, "Radix 16 SRT Dividers with Overlapped Quotient Selection Stages", Proc. Seventh IEEE Symp. Computer Arithmetic, pp. 64-71, 1985 (Year: 1985).*

* cited by examiner

CIRCUITRY AND METHOD FOR PERFORMING DIVISION

BACKGROUND

The present disclosure relates to the field of data processing. More particularly, it relates to a circuitry and method for performing division.

In a data processing apparatus, instructions can be issued in order to perform arithmetic operations on operands. For example, an instruction could be issued to divide an dividend x by a divisor d, with the dividend and the divisor being operands. One mechanism for performing division is digit-recurrence, which uses an iterative process to produce a digit of the result at each iteration.

SUMMARY

Viewed from a first example configuration, there is provided a data processing apparatus comprising: signal receiving circuitry to receive a signal corresponding to a divide instruction that identifies a dividend x and a divisor d; processing circuitry to perform, in response to said divide instruction, a radix-N division algorithm to generate a result value q=x/d, where N is an integer power of 2 and greater than 1, wherein said division algorithm comprises a plurality of iterations, each of said plurality of iterations being performed by: quotient digit calculation circuitry to determine a quotient value of that iteration q[i+1] based on a remainder value of a previous iteration rem[i]; and remainder calculation circuitry to determine a remainder value of that iteration rem[i+1] based on said quotient value of that iteration q[i+1] and said remainder value of said previous iteration rem[i]; and result calculation circuitry to derive said result value q based on each quotient value selected by said digit selection circuitry for each of said plurality of iterations, wherein for at least some of said plurality of iterations, said quotient digit calculation circuitry speculatively determines a set of candidate values before a quotient value of said previous iteration is known and, in response to said quotient value of said previous iteration becoming known, determines said quotient value of that iteration q[i+1] based on one of said candidate values.

Viewed from a second example configuration, there is provided a method comprising steps: receiving a signal corresponding to a divide instruction that identifies a dividend x and a divisor d; performing, in response to said divide instruction, a radix-N division algorithm to generate a result value q=x/d, where N is an integer power of 2 and greater than 1, wherein said division algorithm comprises a plurality of iterations, each of said plurality of iterations being performed by: determining a quotient value of that iteration q[i+1] based on a remainder value of a previous iteration rem[i]; and determining a remainder value of that iteration rem[i+1] based on said quotient value of that iteration q[i+1] and said remainder value of said previous iteration rem[i]; and deriving said result value q based on each quotient value for each of said plurality of iterations, wherein for at least some of said plurality of iterations, a set of candidate values are speculatively determined before a quotient value of said previous iteration is known and, in response to said quotient value of said previous iteration becoming known, said quotient value of that iteration q[i+1] is determined based on one of said candidate values.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
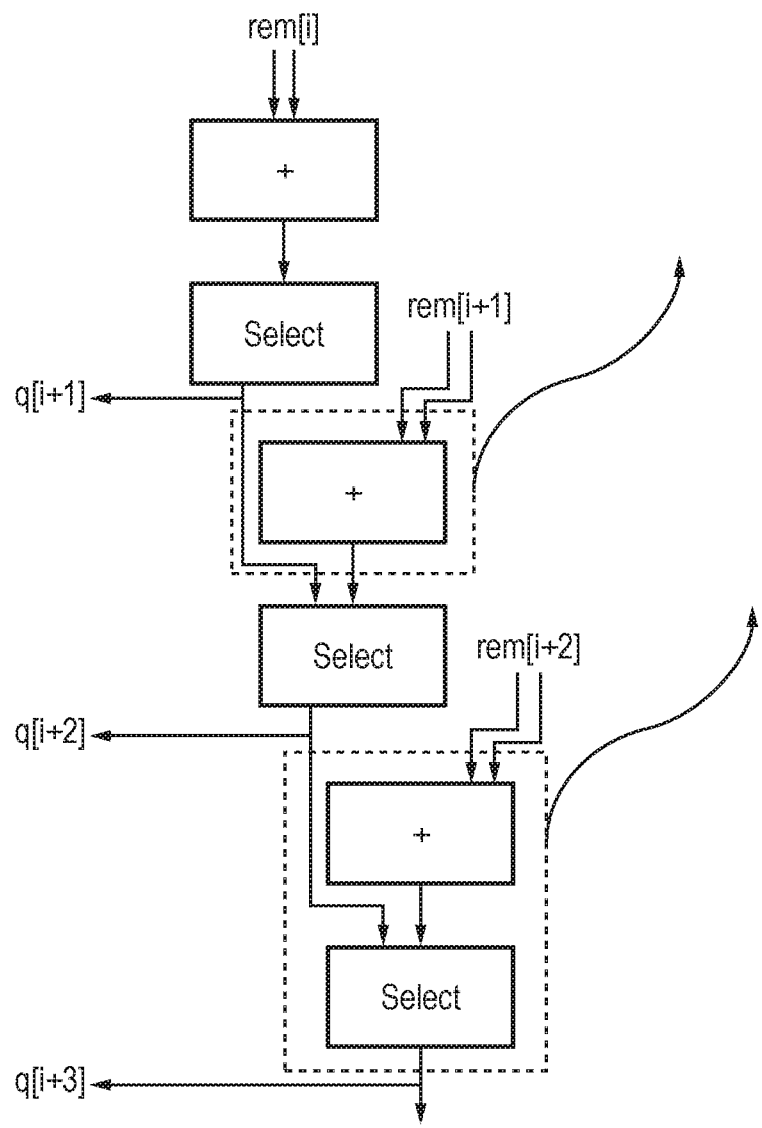
FIG. 1 illustrates part of the data flow in a method of performing a division operation in accordance with one embodiment.

Before discussing the embodiments with reference to the accompanying figures, the following description of embodiments is provided.

In accordance with one example configuration there is provided a data processing apparatus comprising: signal receiving circuitry to receive a signal corresponding to a divide instruction that identifies a dividend x and a divisor d; processing circuitry to perform, in response to said divide instruction, a radix-N division algorithm to generate a result value q=x/d, where N is an integer power of 2 and greater than 1, wherein said division algorithm comprises a plurality of iterations, each of said plurality of iterations being performed by: quotient digit calculation circuitry to determine a quotient value of that iteration q[i+1] based on a remainder value of a previous iteration rem[i]; and remainder calculation circuitry to determine a remainder value of that iteration rem[i+1] based on said quotient value of that iteration q[i+1] and said remainder value of said previous iteration rem[i]; and result calculation circuitry to derive said result value q based on each quotient value selected by said digit selection circuitry for each of said plurality of iterations, wherein for at least some of said plurality of iterations, said quotient digit calculation circuitry speculatively determines a set of candidate values before a quotient value of said previous iteration is known and, in response to said quotient value of said previous iteration becoming known, determines said quotient value of that iteration q[i+1] based on one of said candidate values.

In a radix-N division algorithm, the algorithm considers a set of bits as a single digit in each iteration. If the desired number of bits of the quotient is b then a radix-N algorithm can express the quotient using $b/\log_2(N)$ digits (using signed-digit redundant representation). Each digit will be in the range $[-N/2, +N/2]$. For example, in radix-4, only $b/\log_2(N)=b/\log_2(4)=b/2$ digits are required and each digit will be in the range $[-2, 2]$. If the quotient is 10 bits long, this could be expressed in five digits, e.g. (1)(−2)(0)(1)(−2). This would represent the number $(1)\times 4^4+(-2)\times 4^3+(0)\times 4^2+(1)\times 4^1+(-2)\times 4^0=256-128+0+4-2=130$. For radix-8, only b/3 digits are required and the digits would be in the range $[-4, 4]$.

In each iteration, the next digit of the result (quotient) is determined by quotient digit calculation circuitry. This determination is based on the remainder value from the previous iteration. Also at each iteration, remainder calculation circuitry determines a new remainder value. This is based on the old remainder value (i.e. the remainder value calculated in the last iteration) and the digit of the quotient that was determined in the current iteration. The inventor has realised that for some values of N (e.g. 4) there are only a certain number of values that each quotient digit could be. Therefore, rather than wait for a previous quotient digit to be determined in order to calculate the previous remainder value and thereby determine the quotient digit for the current iteration, some speculative pre-calculation can be performed by calculating a set of candidate values. Once the previous quotient digit is known, a quotient digit for the current iteration can be quickly determined based on a selected one of the candidate values. Consequently, iterations of the division algorithm can be performed more quickly and so more iterations of the algorithm can be performed within each clock period.

In some embodiments, for at least some of said plurality of iterations, said remainder calculation circuitry speculatively determines a set of candidate remainder values before said quotient value of said previous iteration is known and, in response to said quotient value of said previous iteration becoming known, selects one of said candidate remainder values as said remainder value of that iteration rem[i+1] in dependence on said quotient value of said previous iteration. If there are five possible values that the quotient value of the previous iteration can take then the remainder value, being dependent on the quotient value of the previous iteration, can have five different possible (candidate) values. These, in turn, enable the candidate values for the next iteration to be speculatively calculated before the quotient value from the previous iteration is known. Once the quotient value from the previous iteration is known, a "correct" one of the candidates can be selected from the candidate values and the candidate remainder values, and both the remainder value from the previous iteration and the quotient value from the next iteration can be quickly determined.

In some embodiments, said set of candidate values comprises one candidate value corresponding to each of said candidate remainder values. Accordingly, for each candidate remainder value, a different candidate value can exist.

In some embodiments, each of said candidate values is speculatively determined based on an approximation of a corresponding one of said candidate remainder values. Rather than determining the candidate values based on exact values of the candidate remainder values, determining the candidate values based on approximations can reduce the amount of circuitry required and the time taken to determine the candidate values, due to fewer bits being processed. If the approximation is close enough to the actual candidate remainder value then this may have little or no effect on the calculation of the candidate values.

For example, in some embodiments, each of said candidate values is speculatively determined based on most significant bits of a corresponding one of said candidate remainder values. The most significant bits of a value are those bits that have the largest contribution to the value itself. Consequently, by basing the approximation on the most significant bits, it is possible to use a small number of bits in order to obtain an accurate approximation thereby leading to the use of smaller circuitry that can provide faster calculations than if more bits were used to provide the approximations.

For example, in some embodiments, each of said candidate values is speculatively determined based on M most significant bits of a corresponding one of said candidate remainder values, where M is based on N, and a digit set of said quotient value. By using the M most significant bits, it is possible to use as few bits as possible while keeping sufficient accuracy of the approximation such that the candidate values are correct.

In some embodiments, said quotient digit calculation circuitry determines said quotient value of that iteration q[i+1] as a largest single radix-N digit that, when multiplied by said divisor d, is less than said remainder value of said previous iteration rem[i]. The digit itself is an integer, since a single digit does not enable the expression of fractions. Considering an example using radix-4, a divisor d of 3 and a remainder of 7, the quotient digit is 2. This is because any higher number than 2 would result in a multiplication result greater than 7, whereas 3 multiplied by 2 is only 6. Note that the number "2" is a single digit in radix-4, which uses two bits to express each "digit".

In some embodiments, said at least some of said plurality of iterations comprises second and subsequent iterations. For the second and subsequent iterations, the candidate values are determined speculatively such that they are calculated before the quotient value of the previous iteration is known. In some of these embodiments, no speculative calculation is performed for the first iteration.

In some embodiments, said divisor and said dividend share a bit position of a most significant bit. For example, expressed in binary, when the divisor is 0010010101, the dividend is between 0010000000 and 0011111111 such that each of the dividend and the divisor share a bit position of a most significant bit, i.e. the third bit from the left. In other words, the divisor is at least half and less than twice the dividend and the dividend is at least half and less than twice the divisor.

In some embodiments, there is provided input scaling circuitry to perform an input scaling operation on at least one of said divisor and said dividend such that said divisor and said dividend share a bit position of a most significant bit; and output scaling circuitry to cause said processing circuitry to derive said result value q by concatenating each quotient value determined by said digit selection circuitry for each of said plurality of iterations and performing an output scaling operation to produce said result value q, wherein said output scaling operation compensates for said input scaling operation. Accordingly, it is possible to provide an divisor and an dividend that do not share a bit position of a most significant bit. An input scaling operation is performed on at least one of the dividend and the divisor, such that the divisor and the dividend share a bit position of a most significant bit. This can involve multiplying or dividing one or both of the divisor and dividend by different values. An output scaling operation compensates for the input scaling operation at the end of the division algorithm. If the input divisor was multiplied or divided then after concatenating the individual digits of the quotient, the result is multiplied by the same amount to provide q. If the input dividend was multiplied or divided then the concatenation is divided or multiplied by the same amount, respectively, to produce q. For example, if the input dividend was 20 (10100) and the input divisor was 5 (101) then either the input dividend can be divided by 4 or the input divisor can be multiplied by 4 so that the resulting divisor and dividend share a bit position of a most significant bit. If the input dividend is divided by 4, this gives a dividend of 5 (101). The result of this division (5/5) is 1. An output scaling operation is then performed to compensate for the initial input scaling operation. This is achieved by multiplying the result by 4, to give an result value q of 4. If the input divisor is multiplied by 4, this gives a divisor of 20 (10100). The result of this division (20/20) is 1. Since the divisor was scaled, the same operation is performed to the concatenation to give the output (i.e. multiply 1 by 4) to give a result value of 4. In each case, it will be appreciated the result of dividing the input dividend by the input divisor (20/5) is 4.

In some embodiments, said divisor is close to 1.

In some embodiments, there is provided divisor scaling circuitry to perform a scaling operation on both said divisor and said dividend such that said divisor is greater than 1−(1/64) and less than 1+(1/8). Such a range may be appropriate where the radix is 4 and both the divisor and dividend are floating point numbers. The same scaling operation is performed on both the dividend and the divisor. Consequently, the result of dividing the dividend by the divisor is unaffected. By scaling the divisor, the determination of the quotient value q[i+1] can be made independent of the value of the divisor.

In some embodiments, said dividend x is a floating point number comprising a dividend significand and a dividend exponent, and said divisor d is a floating point number comprising a divisor significand and a divisor exponent; and said data processing apparatus further comprises: exponent calculation circuitry to subtract said dividend exponent from said divisor exponent to produce an output exponent; unpack circuitry to provide said divisor significand and said dividend significand to said processing circuitry and to provide said dividend exponent and said divisor exponent to said exponent calculation circuitry; and normalising and rounding circuitry to perform a normalising operation and a rounding operation based on said output exponent and each quotient value determined by said digit selection circuitry for each of said plurality of iterations to produce result value q. In such embodiments, the division of a floating point number comprising an exponent and a significand or mantissa by another floating, point number also comprising an exponent and a significand or mantissa can be performed. The exponents are handled separately (and differently) from the significands, which are divided as previously discussed. The result of dividing one significand by another is combined with an output exponent, which is the result of subtracting the divisor exponent from the dividend exponent. This is then normalised and rounded in order to produce an output result q, which is also a floating point number.

In some embodiments, at least some of said plurality of iterations are performed in a single clock cycle. For example, said at least some of said plurality of iterations comprises three iterations. As more iterations are performed in a single clock cycle, it is possible to perform a division operation more quickly.

In some embodiments, said quotient digit calculation circuitry further comprise: second quotient circuitry to perform a second iteration in said plurality of iterations, wherein said second quotient circuitry determines said quotient value of that iteration q[i+1] as a largest single radix-N digit that, when multiplied by a selected one of said candidate values, is less than said remainder value of said previous iteration rem[i]; and third quotient circuitry to perform a third iteration in said plurality of iterations, wherein said third quotient circuitry determines said quotient value of that iteration q[i+1] as one of said candidate values. Accordingly, the speculation performed in the second and third iterations is different. In the second iteration, further calculation must be performed on the selected candidate value whereas in the third iteration, the selected candidate value is the quotient value. Note that in other embodiments, the speculation performed in the second and third iterations can be the same. For example, in some embodiments, the speculation performed in the second and third iterations is such that further calculation is necessary. In some other embodiments, the speculation performed in the second and third iterations is such that the candidate value is selected as the quotient value for that iteration.

In some embodiments, N is 4. By increasing the radix, it is possible to process more bits within a single iteration. However, the logic required to process a single iteration may increase. Radix-4 provides a trade-off between a slight increased complexity (as compared to radix-2) while halving the number of iterations required (again as compared to radix-2). Note, however, that other embodiments may use other bases such as radix-2 or radix-8.

In some embodiments, said remainder calculation circuitry determines a remainder value of that iteration rem[i+1] by multiplying said remainder value of said previous iteration rem[i] by N and subtracting said quotient value of that iteration q[i+1] multiplied by said divisor d.

In some embodiments, at least one of said remainder value and said quotient digit are provided in redundant representation. For example, the remainder value could be provided in redundant carry-save format and the quotient digits could be provided in redundant signed-digit format. In redundant representation, the number of bits used to express each digit is doubled. This can be achieved by representing a number having a true value as a pair of numbers that, when added (or subtracted—which the skilled person will appreciate is implemented in digit circuits as an addition operation) together, produce the true value. Particular operations and circuits can be made to operate more quickly by handling data in redundant representation rather than non-redundant representation.

In accordance with another example configuration there is provided a method comprising steps: receiving a signal corresponding to a divide instruction that identifies a dividend x and a divisor d; performing, in response to said divide instruction, a radix-N division algorithm to generate a result value q=x/d, where N is an integer power of 2 and greater than 1, wherein said division algorithm comprises a plurality of iterations, each of said plurality of iterations being performed by: determining a quotient value of that iteration q[i+1] based on a remainder value of a previous iteration rem[i]; and determining a remainder value of that iteration rem[i+1] based on said quotient value of that iteration q[i+1] and said remainder value of said previous iteration rem[i]; and deriving said result value q based on each quotient value for each of said plurality of iterations, wherein for at least some of said plurality of iterations, a set of candidate values are speculatively determined before a quotient value of said previous iteration is known and, in response to said quotient value of said previous iteration becoming known, said quotient value of that iteration q[i+1] is determined based on one of said candidate values.

Particular embodiments will now be described with reference to the figures.

FIG. 1 illustrates part of the data flow in a method of performing a division operation in accordance with one embodiment. The method comprises the use of an iterative algorithm and FIG. 1 illustrates three iterations being performed to produce three output digits q[i+1], q[i+2], and q[i+3]. As can be seen from FIG. 1, each iteration of the algorithm produces the next quotient value digit by performing an addition operation followed by a selection operation.

The addition operation is used in order to convert the previous iteration's remainder value from redundant representation into non-redundant representation. In redundant representation, the remainder value is represented as two separate numbers. It is possible to convert redundant representation to a non-redundant representation by adding the two numbers together. For example, the remainder can be stored as separate "sum" and "carry" values—0000101 and 0100001. To convert these numbers into a non-redundant representation, the numbers are added together to produce the value 0100110 (38). Storing values in redundant representation makes it possible to efficiently perform addition or subtraction operations.

The selection operation is used to determine the next quotient digit. In effect, the selection operation performs one or more comparisons with the possible values of the digit to determine the largest possible value of the digit.

In present embodiments, the addition operation of the second iteration is speculatively performed before the quotient digit of the first iteration is known. Similarly, the addition operation and selection operation of the third iteration are speculatively performed before quotient digit of the second iteration is known. A speed-up of the algorithm can thereby be achieved by obviating the need to wait for a quotient digit to be known before performing the addition and selection operations. Speculation can be performed because although the quotient digit of the previous iteration is not known, it can only take a limited number of values (the number of values being dependent on the radix or base). Consequently, a set of candidate values are calculated in advance of the quotient digit of the previous iteration being known and when the quotient digit of the previous iteration is known, the quotient digit of the current iteration can be quickly determined. Note also that in some embodiments, the output of each quotient digit may be provided in redundant representation and may use a different redundant representation to the one used to represent the remainder value. For example, in some embodiments, the quotient digit may be provided as a signed digit redundant representation comprising a positive word and a negative word. The non-redundant representation can be determined by subtracting the negative word from the positive word.

Figure 2:
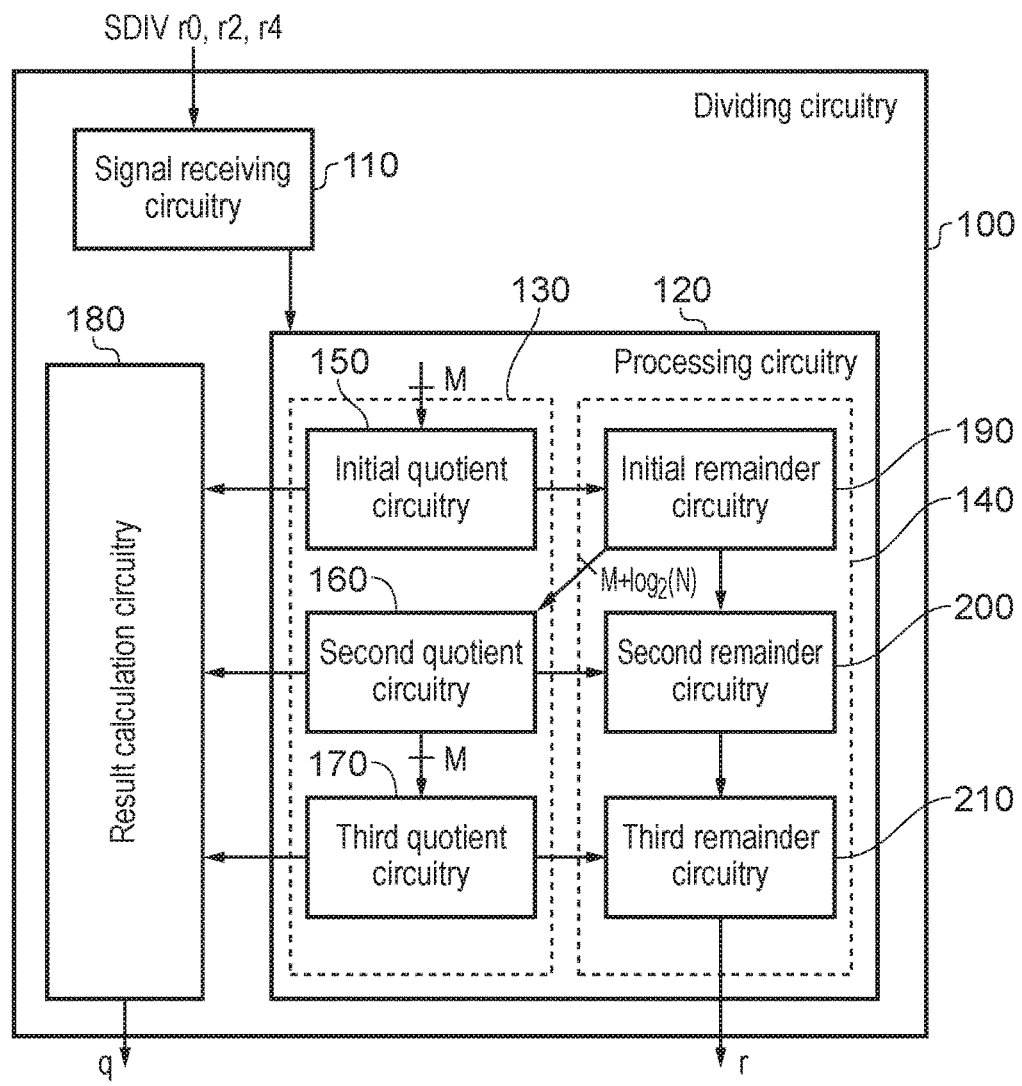
FIG. 2 schematically illustrates dividing circuitry for performing a division operation in accordance with one embodiment.

FIG. 2 illustrates a dividing circuitry 100 in accordance with one embodiment. The dividing circuitry comprises signal receiving circuitry 110, which receives a signal corresponding with a divide instruction. In this example, the divide instruction is "SDIV r0, r2, r4", which causes the number in register r0 to be divided by the number in register r2, and the result to be stored in register r4. This instruction identifies the contents of register r0 as being the dividend x and the contents of register r2 as being the divisor d. In response to the signal receiving circuitry 110 receiving the signal, processing circuitry 120 performs a division algorithm. The processing circuitry 120 includes quotient digit calculation circuitry 130 for calculating each digit of the quotient value and remainder calculation circuitry 140 for calculating a remainder of the division algorithm.

The quotient digit calculation circuitry 130 calculates the quotient digit q[i+1] by the equation:

$$q[i+1]=sel(4rem[i]) \quad \text{(Equation 1)}$$

Where q is the quotient digit, sel is the selection operation, and rem is the remainder. The square brackets refer to a particular iteration and the value i represents the previous iteration. The value of rem[0] is the dividend x.

The selection operation performs comparisons using a lookup table. The lookup table provides a corresponding quotient digit, given a range of possible values for the previous remainder value multiplied by the radix. To determine the correct quotient digit, one determines which of the ranges the previous remainder value multiplied by the radix falls within and then uses the corresponding value of q[i+1]. A different lookup table must be provided for each radix. For example, for radix-4, assuming that the operands are floating point numbers, the lookup table is as follows:

TABLE 1

| 4 × rem[i] | q[i + 1] |
|---|---|
| [3, 13/8] | +7 |
| [12/8, 4/8] | +1 |
| [3/8, −3/8] | 0 |
| [−4/8, −12/8] | −1 |
| [−13/8, −3] | −2 |

Note that if the operands are integers, then the entries in the first column need to be scaled according to the range of possible values for the operands. Using Table 1, if the value of 4 multiplied by the previous remainder value is 7/8, then the output quotient digit would be +1 because 7/8 lies within the interval [12/8, 4/8]. Conversely, if the value of 4 multiplied by the previous remainder value is −2, then the output quotient digit would be −2 because −2(−16/8) lies within the interval [−13/8, −3].

In the embodiment shown in FIG. 2, the quotient digit circuitry 130 calculates the quotient digit based on an estimate of the previous remainder value. In particular, the quotient digit circuitry considers the most significant bits of the previous remainder value. For example, initial quotient circuitry 150, which calculates the quotient digit in a first iteration, and the third quotient circuitry 170, which calculates the quotient digit in a third iteration, use the most significant M bits of the previous remainder value to determine the quotient digit. M is determined based partly on the digit set for the remainder value and is selected such that the correct value of q[i+1] is taken despite only using some of the most significant bits. The second quotient circuitry 160, which calculates the quotient digit in a second iteration, uses the most significant $M+\log_2(N)$ bits of the previous remainder value to determine the quotient digit, where N is the radix. The additional $\log_2(N)$ bits are necessary to compensate for the multiplication that occurs (by N), which causes $\log_2(N)$ bits to be 'lost', and still provide M bits for the process of selecting the third digit.

The output from each of the initial quotient circuitry 150, second quotient circuitry 160, and third quotient circuitry 170 are provided to result calculation circuitry 180, which concatenates the digits to produce the overall quotient result q. Note that the outputs from each of the initial quotient circuitry 150, second quotient circuitry 160, and third quotient circuitry 170 are in a redundant representation and so the result calculation circuitry 180 also performs a conversion to non-redundant representation by performing an addition or subtraction (depending on the type of representation used) of the two words that make up the redundant representation together. In this embodiment, the redundant representation used to represent the quotient is a signed-digit redundant representation, comprising a positive word and a negative word. The non-redundant representation is provided by subtracting the negative word from the positive word. For example, if the positive word is $(1)(0)(0)(1)(0)=2^8+2^2=260$, and the negative word is $(0)(2)(0)(0)(2)=2^7-2^{1=130}$, then the non-redundant representation of this value is 260−130=130. Note that in signed-digit representation, if a digit is positive (negative) then the corresponding digit in the negative (positive) word will be zero. In the above example, the first digit is a '1' in the positive word and therefore a '0' in the negative word.

The remainder calculation circuitry 140 calculates the remainder digit rem[i+1] by the equation:

$$\text{rem}[i+1] = N(\text{rem}[i]) - d(q[i+1]) \quad \text{(Equation 2)}$$

Where rem is the remainder, N is the radix (or base), d is the divisor, and q is the quotient digit. Again, the square brackets refer to a particular iteration and the value i represents the previous iteration. The value of rem[0] is equal to the dividend x.

The remainder calculation circuitry 140 comprises initial remainder circuitry 190, which provides an updated remainder value to second remainder circuitry 200, which provides an updated remainder value to third remainder circuitry 210. The output r from the third remainder circuitry 210 can either be provided back to the initial quotient circuitry 150 if the algorithm is to continue for three iterations, or it can be provided to rounding circuitry in order to determine if and how the output of the result calculation circuitry 180 is to be rounded.

Figure 3:
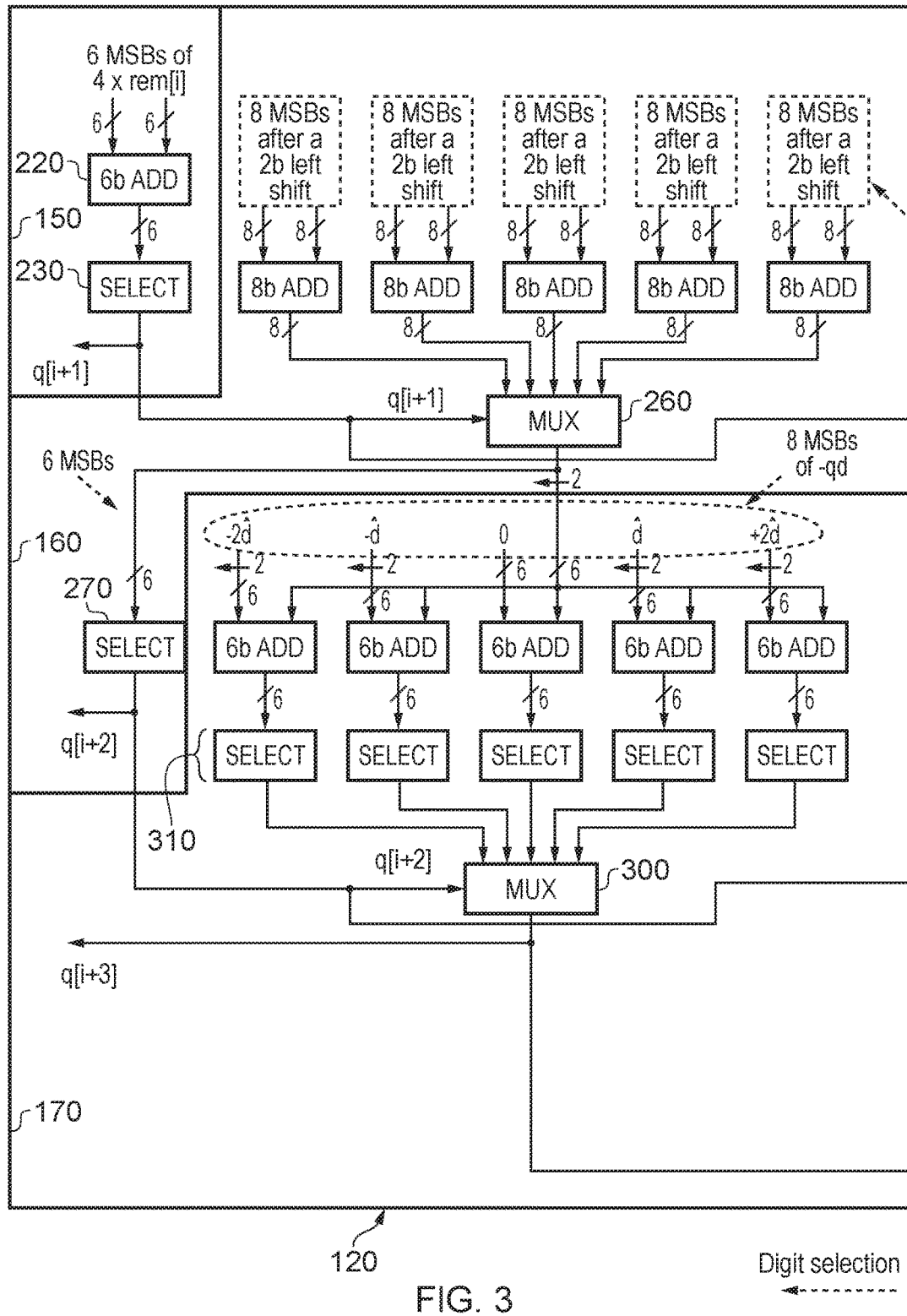
FIG. 3 provides a detailed schematic of the dividing circuit of FIG. 2 in accordance with one embodiment.
Figure 3:
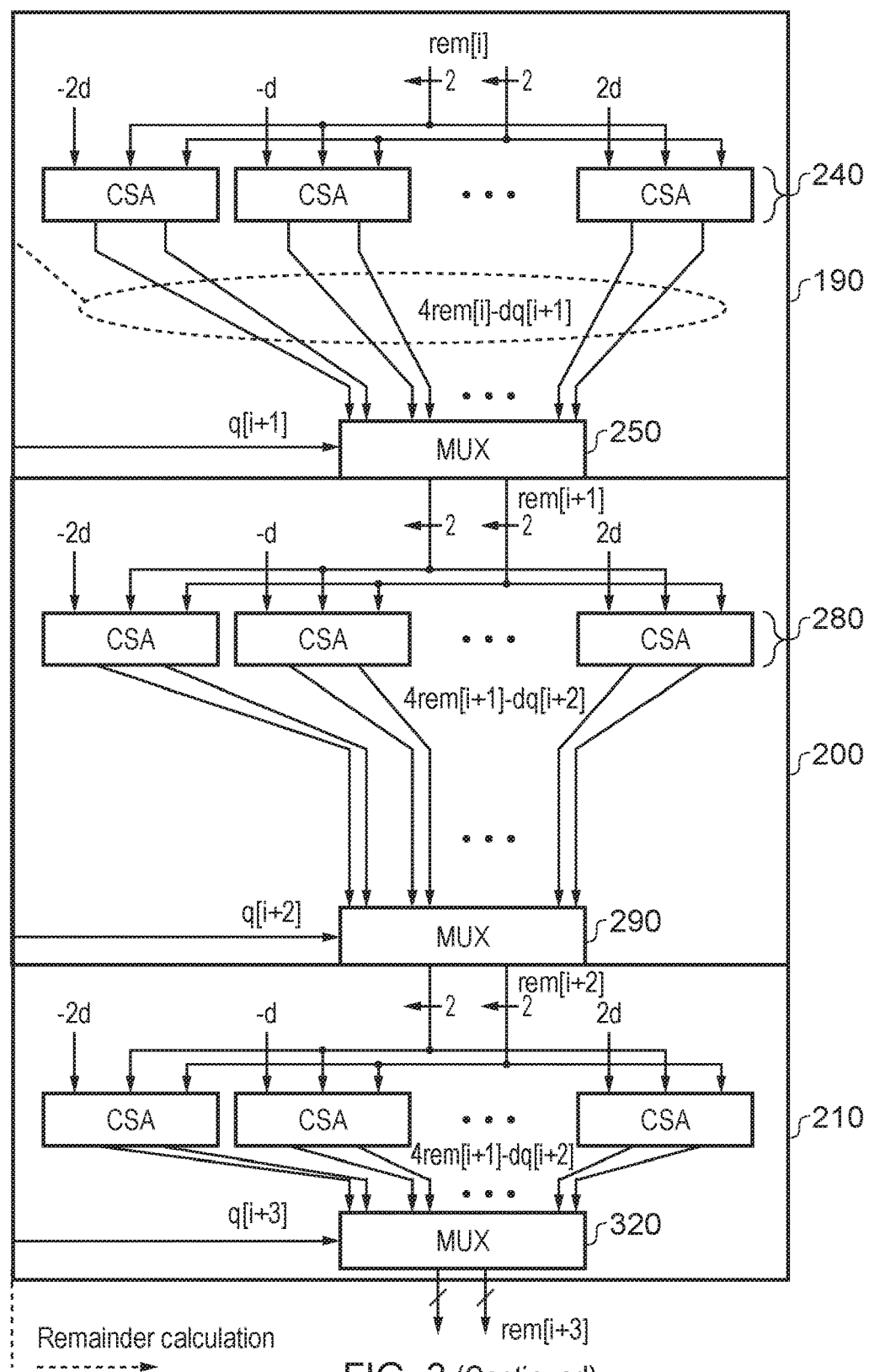

FIG. 3 provides a detailed schematic of the dividing circuit of FIG. 2 in accordance with one embodiment. FIG. 3 shows the initial quotient circuitry 150, second quotient circuitry 160, and third quotient circuitry 170 that respectively determine the first, second and third quotient digits, together with the initial remainder circuitry 190, second remainder circuitry 200, and third remainder circuitry 210 that respectively determine the remainder at the first second and third iterations.

The initial quotient circuitry 150 receives the six most significant bits from the result of multiplying the previous remainder value by 4 (the radix N). The value of rem[0] is x, the dividend. The previous remainder is provided in redundant representation, i.e. as two values that must be added together using, for example, a 6 hit adder 220. The result is then used to perform the selection operation as previously discussed using selection circuitry 230. The result of the selection circuitry is the quotient digit q[i+1], as per Equation (1).

The initial remainder circuitry 190 speculatively calculates the remainder value rem[i+1] before the required quotient value q[i+1] is known, using Equation (2) defined above. The initial remainder circuitry 190 achieves this by taking advantage of the fact that the quotient value q[i+1] can only have a limited number of values. In particular, it can only have a value supported by the radix. Given a redundant representation, with a radix of 4, this includes the digits −2, −1, 0, 1, and 2. In accordance with Equation (2), the previous remainder value rem[i] is left shifted twice thereby performing a multiplication by 4 (the radix). The remainder value is then added to each possible value of q multiplied by d, i.e. −2d, −1d, 1d, and 2d using carry save adders 240. The results are a set of candidate remainder values. Since the previous remainder value rem[i] and the output from the carry save adders are both provided in redundant representation, the carry save adders are able to operate efficiently. The candidate remainder values are provided to a multiplexer 250, and the most significant bits of the candidate remainder values are provided to the second quotient circuitry 160. The selection signal to the multiplexer 250 corresponds with the actual value of q[i+1]. Consequently, candidate remainder values are calculated before the quotient value q[i+1] is known and once the quotient value q[i+1] is known, the remainder value is selected from the candidates without further calculation.

The second quotient circuitry 160 performs speculative calculations that lead to determining the quotient value q[i+2]. The second quotient circuitry 160 receives the candidate remainder values from the initial remainder circuitry 190. Recall that each of the candidate remainder values in the initial remainder circuitry 190 is determined assuming a different quotient value from the previous iteration q[i+1]. Each of the candidate remainder values is left shifted twice, effectively performing a multiplication by 4. The M+log$_2$(N)=6+2=8 most significant bits of each of the candidate remainder values from the initial remainder circuitry 190 are then taken by the second quotient circuitry 160 to form a different candidate value. Each of the candidate values is provided as a pair of values (i.e. in redundant representation) and so each pair of values must be added together before being provided to a multiplexer 260. The selection signal to the multiplexer 260 is the quotient value q[i+1] from the initial quotient circuitry 150. Accordingly, when the quotient value from the previous iteration is known, the correct candidate value is selected via multiplexer 260. The candidate value therefore corresponds with 4×rem[i+1], which is used to perform the selection operation in accordance with Equation (1) using selection circuitry 270. The output from the selection circuitry corresponds with quotient digit q[i+2]. Separately, the output from multiplexer 260 is also shifted left twice (i.e. multiplied by 4) thereby giving 16×rem[i+1] and this is provided to the third quotient circuitry 170.

The second remainder circuitry 200 speculatively calculates the remainder value rem[i+2] before the corresponding required quotient value q[i+2] is calculated (see Equation (2), above). The second remainder circuitry 200 takes advantage of the fact that the quotient value q[i+2] can only have a limited number of values, in particular, it can only have a value supported by the radix. Given a redundant representation, with a radix of 4, this includes the digits −2, −1, 0, 1, and 2. In accordance with Equation (2), the previous remainder value rem[i+1] is left shifted twice thereby performing a multiplication by 4 (the radix). The remainder value is then added to each possible value of q multiplied by d, i.e. −2d, −1d, 1d, and 2d using carry save adders 280. The results are a set of candidate remainder values. Since the previous remainder value rem[i+1] and the output from the carry save adders are both provided in redundant representation, the carry save adders are able to operate efficiently. The candidate remainder values are provided to a multiplexer 290. The selection signal to the multiplexer 290 corresponds with the actual value of q[i+2]. Consequently, candidate remainder values are calculated before the quotient value q[i+2] is known and once the quotient value q[i+2] is known, the remainder value is selected from the candidates without further calculation.

The third quotient circuitry 170 performs speculative calculations that lead to determining the quotient value q[i+3]. The third quotient circuitry 170 receives, in this example, M=6 most significant bits of 16×rem[i+1] from the second quotient circuitry 160. This value is added to d multiplied by each possible digit of q—i.e. −2d, −d, 0, d, and 2d left shifted twice (i.e. multiplied by four). Effectively, the addition being performed therefore corresponds with:

16rem[i+1]−4dq for each possible value of q (−2, −1, 0, 1, and 2). This is equal to:

4(4rem[i+1]−dq)

Via Equation (2), by considering each possible value of q, this corresponds with:

4(rem[i+2])

The selection operation is then performed on each of the possible values to give a different candidate value. Via Equation 1, each of the candidate values corresponds with a different possible value of q[i+3] assuming a different value of q[i+2]. These candidates are provided to a multiplexer 300, the selection signal for which is q[i+2] itself. The multiplexer then outputs the correct one of the candidate quotient values provided to the multiplexer 300 without further calculation.

The third remainder circuitry 210 speculatively calculates the remainder value rem[i+3] before the corresponding required quotient value q[i+3] is calculated (see Equation (2), above). The third remainder circuitry 210 takes advantage of the fact that the quotient value q[i+3] can only have a limited number of values. In particular, it can only have a value supported by the radix. Given a redundant representation, with a radix of 4, this includes the digits −2, −1, 0, 1, and 2. In accordance with Equation (2), the previous remainder value rem[i+2] is left shifted twice thereby performing a multiplication by 4 (the radix). The remainder value is then added to each possible value of q multiplied by d, i.e. −2d, −1d, 1d, and 2d using carry save adders 280. The results are a set of candidate remainder values. Since the previous remainder value rem[i+2] and the output from the carry save adders are both provided in redundant representation, the carry save adders are able to operate efficiently. The candidate remainder values are provided to a multiplexer 320. The selection signal to the multiplexer 320 corresponds with the actual value of q[i+3]. Consequently, candidate remainder values are calculated before the quotient value q[i+3] is known and once the quotient value q[i+3] is known, the remainder value is selected from the candidates without further calculation.

The final remainder value rem[i+3] can be provided back to the initial remainder circuitry 190 and the initial quotient circuitry 150 if the processing circuitry is to complete another three iterations. Alternatively, the remainder value rem[i+3] can be provided to rounding circuitry after being converted from redundant representation to non-redundant representation by addition.

Figure 4:
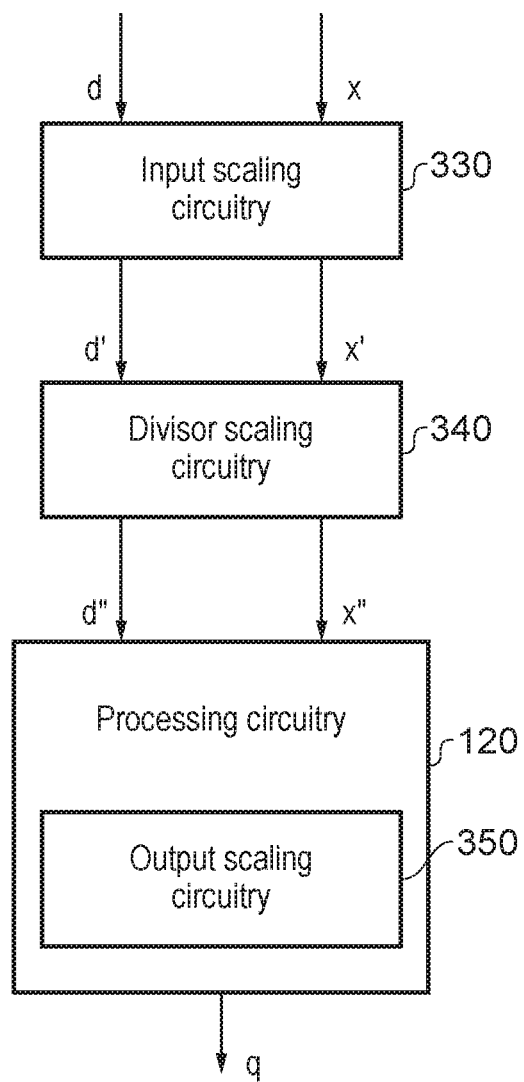
FIG. 4 schematically illustrates circuitry for performing division of arbitrary divisors and dividends, in accordance with one embodiment.

In some embodiments, the divisor d and the dividend x are constrained. In particular, the divisor d and dividend x must share a bit position of a most significant bit. In some embodiments, the divisor d is constrained such that it must be close to 1.0. Each of these limitations can be met by the use of additional circuitry, as shown in FIG. 4. In particular, given a divisor and dividend (as indicated by a division instruction), input scaling circuitry 330 scales one or both such that the two numbers share a bit position of a most significant bit. Such scaling can take place using multiplication and/or division. Divisor scaling circuitry 340 is provided in order to scale the divisor so that the divisor is close to 1. In particular, in this embodiment, the divisor scaling circuitry 340 scales the divisor so that it is between $1−(1/64) \leq d \leq 1+(1/8)$, which is a suitable range when the radix is 4 and the divisor and dividend are both floating point numbers. In other embodiments, where the divisor and dividend are not floating point numbers, the divisor is scaled to be in a different range. For example, if the divisor and dividend were 10-bit integer values with the most significant bit equal to 1, the divisor and dividend would be in the range $[1000000000, 1111111111]=[2^9, 2^{10}−1]$. The divisor would therefore be scaled to a small interval around $2^9$. The range of the scaled divisor thereby depends on the range of the non-scaled divisor. Again, such scaling can take place using multiplication or division. In order to maintain the relationship between the divisor and dividend, the same scaling operation that is applied to the divisor by the divisor scaling circuitry 340 is also applied to the dividend. The resulting divisor and dividend are then provided to the processing circuitry 120 as previously discussed. Output scaling circuitry 350 then compensates for the operation performed by the input scaling circuitry 330. In particular, the processing circuitry concatenates the individual quotient digits q[1], q[2], q[3], etc. and if the quotient digits are provided in redundant representation, converts the result into a non-redundant representation (i.e. by addition or subtraction). The output scaling circuitry then causes the result of that concatenation to be adjusted by performing the same operation performed by the input scaling circuitry 330. Similarly any operation performed to the dividend by the input scaling circuitry 330 is inverted and applied to the result of the concatenation. For example, if the divisor is multiplied by 5 by the input scaling circuitry 330 then the result of the concatenation is also multiplied by 5. If the dividend is divided by 12 by the input scaling circuitry 330 then the inverse operation (a multiplication by 12) is performed to the result of the concatenation.

Figure 5:
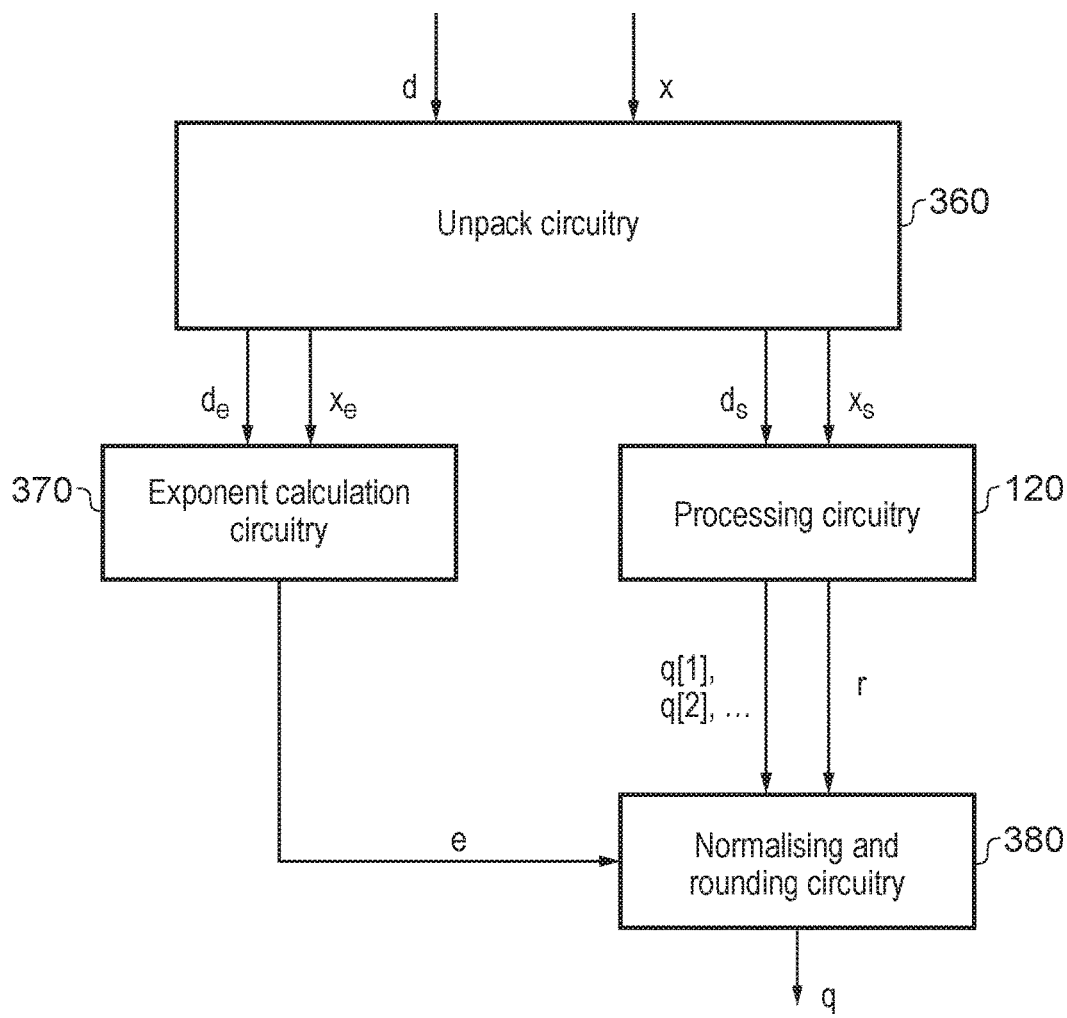
FIG. 5 schematically illustrates an apparatus for performing division on floating point numbers in accordance with one embodiment.

FIG. 5 illustrates an embodiment in which the divisor and the dividend are floating point numbers. A floating point number can be used to represent non-integer numbers and comprises a significand, and an exponent. The value of the floating point number is equal to the significand, multiplied by a fixed base (e.g. 2) raised to the power of the exponent. Each of the significand and the exponent are represented using a fixed number of bits (depending on the type of floating point number). In the embodiment shown in FIG. 5, unpack circuitry unpacks both the divisor and the dividend. The exponents of the divisor and the dividend are provided to exponent calculation circuitry 370, which subtracts the divisor exponent from the dividend exponent and returns the resulting output exponent e to normalising and rounding circuitry 380. Meanwhile, the divisor significand and the dividend significand are provided to processing circuitry 120 in order to produce a set of quotient digits q[1], q[2], q[3], etc. and a remainder value r, as previously discussed, to the normalising and rounding circuitry. The quotient digits are concatenated (and converted to non-redundant representation if they are in redundant representation) in order to form the significand of a new output floating point number, with an exponent e. Normalising and rounding operations also take place. In particular, the process of normalising ensures that only a single bit is used to represent the integer component in the significand. Rounding is the process in which the final digit is adjusted to compensate for the fact that the floating point number may only be an approximation of the real number. For example, rounding is used to express the fraction ⅓ as the decimal 0.333 . . . 34. There are numerous methods that can be used for rounding and the exact method used may be dependent on the underlying application. The process of normalising and rounding can result in adjustments being made to either the significand or the exponent of the result floating point number.

In the first iteration, the quotient digit q[1] is provided with the aid of the lookup table such as Table 1 described above as well as the 6 most significant bits of rem[0]. The remainder is obtained speculatively, with five candidates being produced. Once q[1] is known, the correct candidate value can be selected. In accordance with Equation (2), then, the five candidates are as follows:

TABLE 2

| S: 001.0100100100 | S: 001.0100100100 | S: 001.0100100100 | S: 001.0100100100 | S: 001.0100100100 |
|---|---|---|---|---|
| C: 000.0000000000 | C: 000.0000000000 | C: 000.0000000000 | C: 000.0000000000 | C: 000.0000000000 |
| 2d: 010.0011101000 | d: 001.0001110100 | 0d: 000.000000000 | −d: 110.1110001100 | −2d: 101.1100011000 |
| --- | --- | --- | --- | --- |
| S: 011.0111001100 | S: 000.0101010000 | S: 001.0100100100 | S: 111.1010101000 | S: 100.1000111100 |
| C: 000.0001000000 | C: 010.0001001000 | C: 000.000000000 | C: 000.1000001000 | C: 010.1000000000 |

Figure 6:
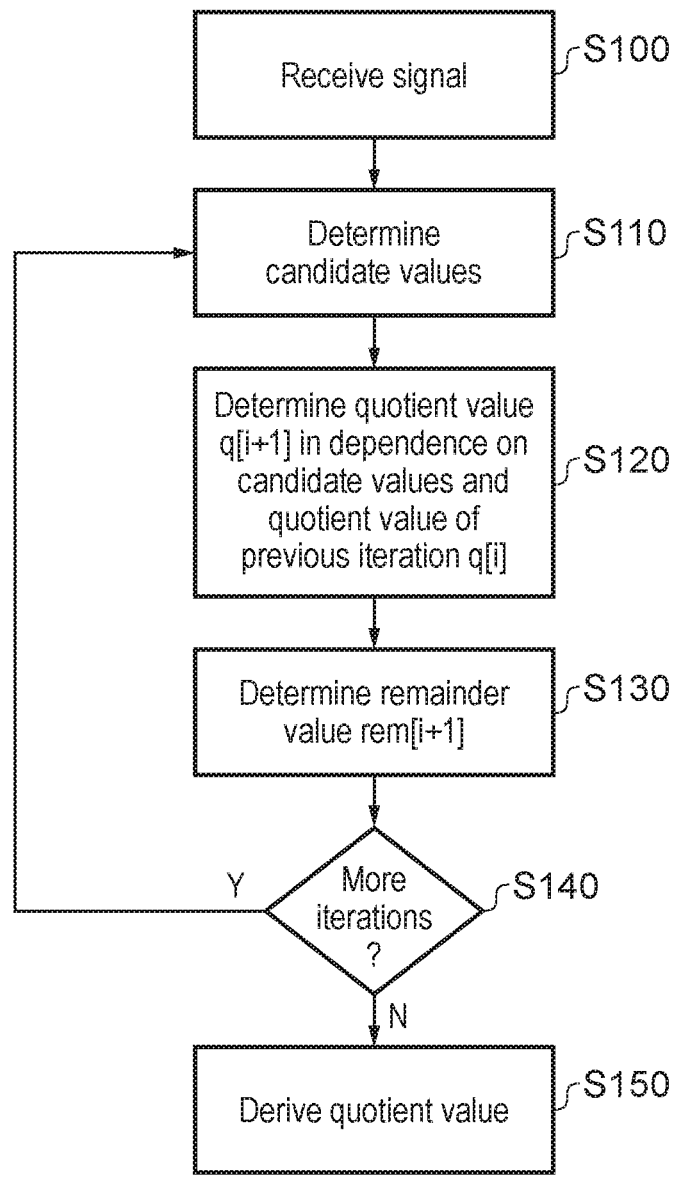
FIG. 6 is of a flow chart illustrating a method of performing a division operation in accordance with one embodiment.

FIG. 6 is of a flow chart illustrating a method of performing a division operation in accordance with one embodiment. In a step S100, a divide instruction is received that identifies a dividend x and a divisor d. In a step S110, a set of candidate values is speculatively determined. The set of candidate values are based on a remainder value of a previous iteration rem[i]. For example, a different candidate value could be derived for each possible value of rem[i]. In a step S120, the quotient value q[i+1] is determined in dependence on the candidate values and on the quotient value of the previous iteration. For example, one of the candidate values could be selected, or one of the candidate values could be selected and further calculations performed in order to derive the quotient value. At a step S130, the remainder value rem[i+1] is determined based on the quotient value q[i+1] of that iteration and the remainder value of the previous iteration rem[i]. At a step S140, it is determined whether or not there are more iterations. If so, then the process returns to step S110 where the set of candidate values is determined. Otherwise, at step S150, the overall quotient value is determined. Accordingly, it can be seen from the above flowchart how the candidate values are speculatively determined before a quotient value of the previous iteration is known. Once the quotient value of the previous iteration is known, the quotient value of that iteration is determined based on one of the candidate values.

The following example demonstrates numerically how the above algorithm can be applied to a radix-4 division. This example considers half-precision floating point numbers, in which the significand comprises 10 bits. The division instruction identifies x=1.0100100100 (in decimal x=1.28515625) and d=1.0001110100 (in decimal d=1.11328125). Note that, the result of this division should be 1.154385965 (1.0010011110 in binary).

For convenience, the multiples (−2, −1, 0, 1, and 2) of d are: 010.0011101000, 001.0001110100, 0, 110.1110001100, and 101.1100011000).

Additionally, redundant carry-save representation is used. This comprises sum (S) and carry (C) components. The non-redundant remainder is obtained by adding these two words together.

The initial remainder, rem[0] is defined as x, i.e. with S=001.0100100100 and C=000.0000000000. The six most significant bits are 001.010 which equals 10/8 and is therefore in the interval [12/8, 4/8], which corresponds with a digit of 1 (see Table 1).

Since q[1]=+1, the selected candidate is the one with multiple −d (i.e. where q=1). Therefore rem[1]=

S: 111.1010101000
C: 000.1000001000

In the second iteration, the quotient digit q[2] is again provided with the aid of the lookup table such as Table 1 described above as well as the 8 most significant bits of the candidates for rem[1] (in Table 2). The remainder is obtained speculatively, with five candidates being produced. Once q[1] is known, the correct candidate value can be selected. The 8 most significant bits of the 5 candidates for rem[1] are achieved by adding together the Sum (S) and Carry (C) values to obtain a non-redundant representation:

TABLE 3

| 2d | d | 0 | −d | −2d |
|---|---|---|---|---|
| S: 011.01110 | S: 000.01010 | S: 001.01001 | S: 111.10101 | S: 100.10001 |
| C: 000.00010 | C: 010.00010 | C: 000.00000 | C: 000.10000 | C: 010.10000 |
| --- | --- | --- | --- | --- |
| 011.1000 0 | 010.01100 | 001.01001 | 000.00101 | 111.000001 |

Since q[1]=+1, the selected candidate is the one with multiple −d (i,e. where q=1). Therefore, the selected candidate is 000.00101. This is multiplied by 4, to give 000.101. Note that, as an alternative, each of the Sum and Carry values shown in Table 3 can be multiplied by 4 (left shifted twice) before being added together. In any event, the result is 5/8, which corresponds with the interval [12/8, 4/8] in Table 1. q[2], therefore, is +1.

Each of the candidates for rem[2] can then be speculatively determined. Note that in accordance with Equation (2), rem[2]=4×rem[1]=qd, for each possible value of q (−2, −1, 0, 1, and 2). Therefore:

TABLE 4

| S: 110.1010100000 | S: 110.1010100000 | S: 110.1010100000 | S: 110.1010100000 | S: 110.10101000000 |
|---|---|---|---|---|
| C: 010.0000100000 | C: 010.0000100000 | C: 010.0000100000 | C: 010.0000100000 | C: 010.0000100000 |
| 2d: 010.0011101000 | d: 001.0001110100 | 0d: 000.00000000 | –d: 110.1110001100 | –2d: 101.1100011000 |
| ---------------- | ---------------- | ---------------- | ---------------- | ---------------- |
| S: 110.1001101000 | S: 101.10111101 | S: 111.1010100000 | S: 110.0100001100 | S: 001.0110011000 |
| C: 100.0101000000 | C: 100.0001000000 | C: 010.0000100000 | C: 101.0101000000 | C: 101.0001000000 |

Since q[2]=+1, the selected candidate is the one with multiple –d. Therefore, rem[2]:

S=110.0100001100

C=101.0101000000

In the third iteration, a speculative calculation of five quotient digit candidates is performed. Additionally, the remainder is obtained speculatively, with five candidates being obtained and the correct one being selected once q[3] is known.

For each possible value of q[i+2], the 6 most significant bits of 4×rem[2]+6 most significant bits of q×d are obtained, for each value of q (–2, –1, 0, 1, and 2).

TABLE 5

| rem[2] = 000.101 | rem[2] = 000.101 | rem[2] = 000.101 | rem[2] = 000.101 | rem[2] = 000.101 |
|---|---|---|---|---|
| –2d = 101.110 | –d = 101.111 | 0d = 000.000 | d = 001.000 | 2d = 010.001 |
| ------------ | ------------ | ------------ | ------------ | ------------ |
| 110.011 | 111.100 | 000.101 | 001.101 | 010.110 | q[2]=+1, therefore, the selected candidate is the one with multiple –d. The value 111.100 corresponds with –4/8 (–4+2+1+0+4/8). Using Table 1, this corresponds with the value –1. Therefore q[3]=–1.

In accordance with Equation (2), rem[3]=4rem[2]–qd, for each value of q (–2, –1, 0, 1. 2). Left shifting each of the Sum (S) and Carry (C) values of rem[2] twice gives the following remainder value candidates:

TABLE 6

| S: 001.0000110000 | S: 001.0000110000 | S: 001.0000110000 | S: 001.0000110000 | S: 001.0000110000 |
|---|---|---|---|---|
| C: 101.0100000000 | C: 101.0100000000 | C: 101.0100000000 | C: 101.0100000000 | C: 101.0100000000 |
| ---------------- | ---------------- | ---------------- | ---------------- | ---------------- |
| S: 110.0111011000 | S: 101.0101000100 | S: 001.0000110000 | S: 010.1010111100 | S: 001.1000101000 |
| C: 010.0001000000 | C: 010.0001100000 | C: 101.0100000000 | C: 010.1000000000 | C: 010.1000100000 |

Since q[3]=–1, the selected candidate is the one with multiple +d. Therefore rem[3]:

S=101.0101000100

C=010.0001100000

The results obtained after three iterations are q[1]=1, q[2]=1, q[3]=–1=1*40+1*4$^{-1}$–1*4$^{-2}$=1.1875. Additional iterations of the algorithm will decrease the result to get the final result. For example, it can be shown that the next digit q[4]=–2. Using this additional value subtracts a further 2*4$^{-3}$ giving a closer result of 1.15625.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
receiver circuitry to receive a signal corresponding to a divide instruction that identifies a dividend x and a divisor d;
processing circuitry to perform, in response to said divide instruction, a radix-N division algorithm for a plurality of radix-N iterations to generate a result value q=x/d, where N is an integer power of 2, said integer power being greater than 1, each of said plurality of radix-N iterations being performed by:
quotient digit calculation circuitry to determine a quotient value of that iteration q[i+1] based on a remainder value of a previous iteration rem[i], wherein the quotient value of that iteration q[i+1] comprises $\log_2(N)$ bits and is within the range [–N/2,+N/2]; and
remainder calculation circuitry to determine a remainder value of that iteration rem[i+1] based on said quotient value of that iteration q[i+1] and said remainder value of said previous iteration rem[i]; and
result calculation circuitry to derive said result value q based on each quotient value determined by said quotient digit selection circuitry for each of said plurality of radix-N iterations, wherein
for at least some of said plurality of radix-N iterations, said quotient digit calculation circuitry is adapted to speculatively determine a set of candidate values before a quotient value of said previous iteration is known and, in response to said quotient value of said previous iteration becoming known, determines said quotient value of that iteration q[i+1] based on one of said candidate values.

2. A data processing apparatus according to claim 1, wherein
for at least some of said plurality of radix-N iterations, said remainder calculation circuitry is adapted to speculatively determine a set of candidate remainder values before said quotient value of said previous iteration is known and, in response to said quotient value of said previous iteration becoming known, select one of said candidate remainder values as said remainder value of that iteration rem[i+1] in dependence on said quotient value of said previous iteration.

3. A data processing apparatus according to claim 2, wherein
said set of candidate values comprises one candidate value corresponding to each of said candidate remainder values.

4. A data processing apparatus according to claim 2, wherein
each of said candidate values is speculatively determined based on an approximation of a corresponding one of said candidate remainder values.

5. A data processing apparatus according to claim 2, wherein
speculatively determination of each of said candidate values is based on most significant bits of a corresponding one of said candidate remainder values.

6. A data processing apparatus according to claim 2, wherein
speculatively determination of each of said candidate values is based on M most significant bits of a corresponding one of said candidate remainder values, where M is based on N, and a digit set of said quotient value.

7. A data processing apparatus according to claim 1, wherein said quotient digit calculation circuitry is adapted to determine said quotient value of that iteration q[i+1] as a largest single radix-N digit that, when multiplied by said divisor d, is less than said remainder value of said previous iteration rem[i].

8. A data processing apparatus according to claim 1, wherein
said at least some of said plurality of radix-N iterations comprises second and subsequent iterations.

9. A data processing apparatus according to claim 1, wherein
said divisor and said dividend share a bit position of a most significant bit.

10. A data processing apparatus according to claim 9, further comprising
input scaling circuitry to perform an input scaling operation on at least one of said divisor and said dividend such that said divisor and said dividend share a bit position of a most significant bit; and
output scaling circuitry to cause said processing circuitry to derive said result value q by concatenating each quotient value determined by said digit selection circuitry for each of said plurality of radix-N iterations and performing an output scaling operation to produce said result value q, wherein said output scaling operation compensates for said input scaling operation.

11. A data processing apparatus according to claim 1, wherein
said divisor is greater than 1−(1/64) and less than 1+(1/8).

12. A data processing apparatus according to claim 1, wherein
said dividend x is a floating point number comprising a dividend significand and a dividend exponent, and said divisor d is a floating point number comprising a divisor significand and a divisor exponent; and
said data processing apparatus further comprises:
exponent calculation circuitry to subtract said dividend exponent from said divisor exponent to produce an output exponent;
unpack circuitry to provide said divisor significand and said dividend significand to said processing circuitry and to provide said dividend exponent and said divisor exponent to said exponent calculation circuitry; and
normalising and rounding circuitry to perform a normalising operation and a rounding operation based on said output exponent and each quotient value determined by said digit selection circuitry for each of said plurality of radix-N iterations to produce result value q.

13. A data processing apparatus according to claim 1, wherein
at least some of said plurality of radix-N iterations are performed in a single clock cycle.

14. A data processing apparatus according to claim 13, wherein
said at least some of said plurality of radix-N iterations comprises three iterations.

15. A data processing apparatus according to claim 1, said quotient digit calculation circuitry further comprising:
second quotient circuitry to perform a second iteration in said plurality of radix-N iterations, wherein said second quotient circuitry determines said quotient value of that iteration q[i+1] as a largest single radix-N digit that, when multiplied by a selected one of said candidate values, is less than said remainder value of said previous iteration rem[i]; and
third quotient circuitry to perform a third iteration in said plurality of radix-N iterations, wherein said third quotient circuitry determines said quotient value of that iteration q[i+1] as one of said candidate values.

16. A data processing apparatus according to claim 1, wherein N is 4.

17. A data processing apparatus according to claim 1, wherein
said remainder calculation circuitry is adapted to determine a remainder value of that iteration rem[i+1] by multiplying said remainder value of said previous iteration rem[i] by N and subtracting said quotient value of that iteration q[i+1] multiplied by said divisor d.

18. A data processing apparatus according to claim 1, wherein
at least one of said remainder value and said quotient digit are provided in redundant representation.

19. A method comprising steps:
receiving a signal corresponding to a divide instruction that identifies a dividend x and a divisor d;
performing, in response to said divide instruction, a radix-N division algorithm for a plurality of radix-N iterations to generate a result value q=x/d, where N is an integer power of 2, said integer power being greater than 1, each of said plurality of radix-N iterations being performed by:
determining, using quotient digit calculation circuitry, a quotient value of that iteration q[i+1] based on a remainder value of a previous iteration rem[i], wherein the quotient value of that iteration q[i+1] comprises $\log_2(N)$ bits and is within the range $[-N/2, +N/2]$; and determining, using remainder calculation circuitry, a remainder value of that iteration rem[i+1] based on said quotient value of that iteration q[i1] received from said quotient digit calculation circuitry and said remainder value of said previous iteration rem[i] calculated by said remainder calculation circuitry; and deriving said result value q based on each quotient value for each of said plurality of iterations, wherein for at least some of said plurality of radix-N iterations, a set of candidate values are speculatively determined before a quotient value of said previous iteration is known and, in response to said quotient value of said previous iteration becoming known, said quotient value of that iteration q[i+1] is determined based on one of said candidate values.

* * * * *